(12) United States Patent
Pieske et al.

(10) Patent No.: US 10,975,988 B2
(45) Date of Patent: Apr. 13, 2021

(54) FASTENING DEVICE FOR HOSES

(71) Applicant: Hamm AG, Tirschenreuth (DE)

(72) Inventors: Ronny Pieske, Zwönitz (DE); Holger Wolfrum, Bärnau (DE)

(73) Assignee: Hamm AG, Tirschenreuth (DE)

( * ) Notice: Subject to any disclaimer, the term of this patent is extended or adjusted under 35 U.S.C. 154(b) by 0 days.

(21) Appl. No.: 15/970,161

(22) Filed: May 3, 2018

(65) Prior Publication Data

US 2018/0320800 A1 Nov. 8, 2018

(30) Foreign Application Priority Data

May 4, 2017 (DE) ...................... 10 2017 207 513.9

(51) Int. Cl.
| | |
|---|---|
| *F16L 3/223* | (2006.01) |
| *F16L 3/10* | (2006.01) |
| *F16L 55/035* | (2006.01) |
| *F16L 3/12* | (2006.01) |

(52) U.S. Cl.
CPC ........... *F16L 3/2235* (2013.01); *F16L 3/1091* (2013.01); *F16L 3/1207* (2013.01); *F16L 55/035* (2013.01)

(58) Field of Classification Search
CPC ...... F16L 3/2235; F16L 3/1207; F16L 55/035
USPC .................................................. 248/68.1, 49
See application file for complete search history.

(56) References Cited

U.S. PATENT DOCUMENTS

| | | | | |
|---|---|---|---|---|
| 678,042 A | * | 7/1901 | Sargent ................... | H02G 7/20 174/149 R |
| 2,355,742 A | * | 8/1944 | Morehouse ........... | F16L 3/2235 174/40 CC |
| 2,404,531 A | * | 7/1946 | Robertson ............. | F16L 3/2235 248/68.1 |
| 2,686,643 A | * | 8/1954 | Bloom .................. | F16L 3/2235 138/112 |
| 2,937,833 A | * | 5/1960 | Sachs .................... | F16L 3/2235 248/49 |

(Continued)

FOREIGN PATENT DOCUMENTS

| | | |
|---|---|---|
| DE | 4205439 A1 | 8/1993 |
| DE | 60309630 T2 | 9/2007 |

(Continued)

OTHER PUBLICATIONS

Search Report dated Nov. 14, 2018 in corresponding German Application No. 10 2017 207 513.9; 12 pages including machine-generated English-language translation.

(Continued)

*Primary Examiner* — Anita M King
(74) *Attorney, Agent, or Firm* — Maier & Maier, PLLC

(57) ABSTRACT

A fastening device for hoses including two fastening parts two fastening parts adapted to be joined with each other and each having at least one recess which, in the joined state of the fastening parts, form at least one passage for at least one hose. The fastening parts are each formed by a fastening body with an elastic fastening component, wherein the fastening body has a lower elasticity than the elastic fastening component. The elastic fastening component respectively forms a recess surface in the recess. The elastic fastening component is molded to the fastening body to form a chemical bond with the same.

8 Claims, 2 Drawing Sheets

(56) References Cited

U.S. PATENT DOCUMENTS

| | | | | |
|---|---|---|---|---|
| 3,244,388 | A | * | 4/1966 | Coffman ............... F16L 59/135 248/62 |
| 3,682,422 | A | * | 8/1972 | Evans .................. F16L 3/2235 248/68.1 |
| 5,060,810 | A | * | 10/1991 | Jones ..................... A47F 7/0035 211/4 |
| 5,205,520 | A | * | 4/1993 | Walker ................. F16L 3/2235 248/68.1 |
| 5,827,441 | A | * | 10/1998 | Solbjorg ................. F16L 3/223 249/91 |
| 5,931,423 | A | * | 8/1999 | Heideloff .............. F16L 3/2235 248/219.3 |
| 5,996,945 | A | * | 12/1999 | Coles .................... F16L 3/2235 24/16 R |
| 6,152,406 | A | * | 11/2000 | Denndou ................ F16L 3/221 248/68.1 |
| 6,889,944 | B2 | * | 5/2005 | Brandzel ................ F16L 3/222 248/65 |
| 6,902,138 | B2 | * | 6/2005 | Vantouroux .......... F16L 3/1091 248/68.1 |
| 6,926,237 | B2 | * | 8/2005 | Shereyk ................ F16B 5/0685 248/71 |
| 7,770,850 | B2 | * | 8/2010 | Allmann ............... F16L 3/2235 248/65 |
| 7,770,851 | B2 | * | 8/2010 | Michaud .................... F16L 3/04 248/65 |
| 8,267,357 | B2 | * | 9/2012 | Kataoka ................ H02G 3/088 174/135 |
| 8,348,204 | B2 | * | 1/2013 | Kataoka ................ H02G 3/088 174/135 |
| 9,982,824 | B2 | * | 5/2018 | Koenig ................. F16L 55/035 |
| 10,309,553 | B1 | * | 6/2019 | Schwalbe .............. F16L 3/222 |
| 2003/0089829 | A1 | * | 5/2003 | Brandzel ................ F16L 3/222 248/68.1 |
| 2004/0124320 | A1 | | 7/2004 | Vantouroux |
| 2005/0116122 | A1 | * | 6/2005 | Nakanishi ............... F16L 3/223 248/68.1 |
| 2006/0249636 | A1 | * | 11/2006 | Thiedig ................. F16L 3/1091 248/74.4 |
| 2007/0018057 | A1 | | 1/2007 | Kovac |
| 2008/0149783 | A1 | | 6/2008 | Michaud |
| 2010/0193651 | A1 | | 8/2010 | Railsback et al. |
| 2010/0207001 | A1 | * | 8/2010 | Smith ................... F16L 3/1075 248/230.4 |
| 2015/0240768 | A1 | | 8/2015 | Rehwald |

FOREIGN PATENT DOCUMENTS

| | | |
|---|---|---|
| DE | 102012216236 A1 | 3/2014 |
| EP | 1 493 954 A1 | 1/2005 |
| WO | 2011/028705 A1 | 3/2011 |
| WO | 2015/177181 A1 | 11/2015 |

OTHER PUBLICATIONS

Search Report dated Sep. 19, 2018 in corresponding European Application No. 18170675.5; 11 pages including partial machine generated English-language translation.

Office Action dated May 24, 2019, in corresponding Chinese Application No. 201810384901.3 including partial English language translation; 7pages.

Chinese Office Action dated Jan. 3, 2020, in connection with corresponding CN Application No. 201810384901.3 (7 pgs., including machine-generated English translation).

European Examination Report dated Nov. 3, 2020, in connection with corresponding EP Application No. 18170675.5 (8 pp., including machine-generated English translation).

Office Action dated May 28, 2020 in corresponding Indian Application No. 201844014932; 6 pages including partial English-language translation.

* cited by examiner

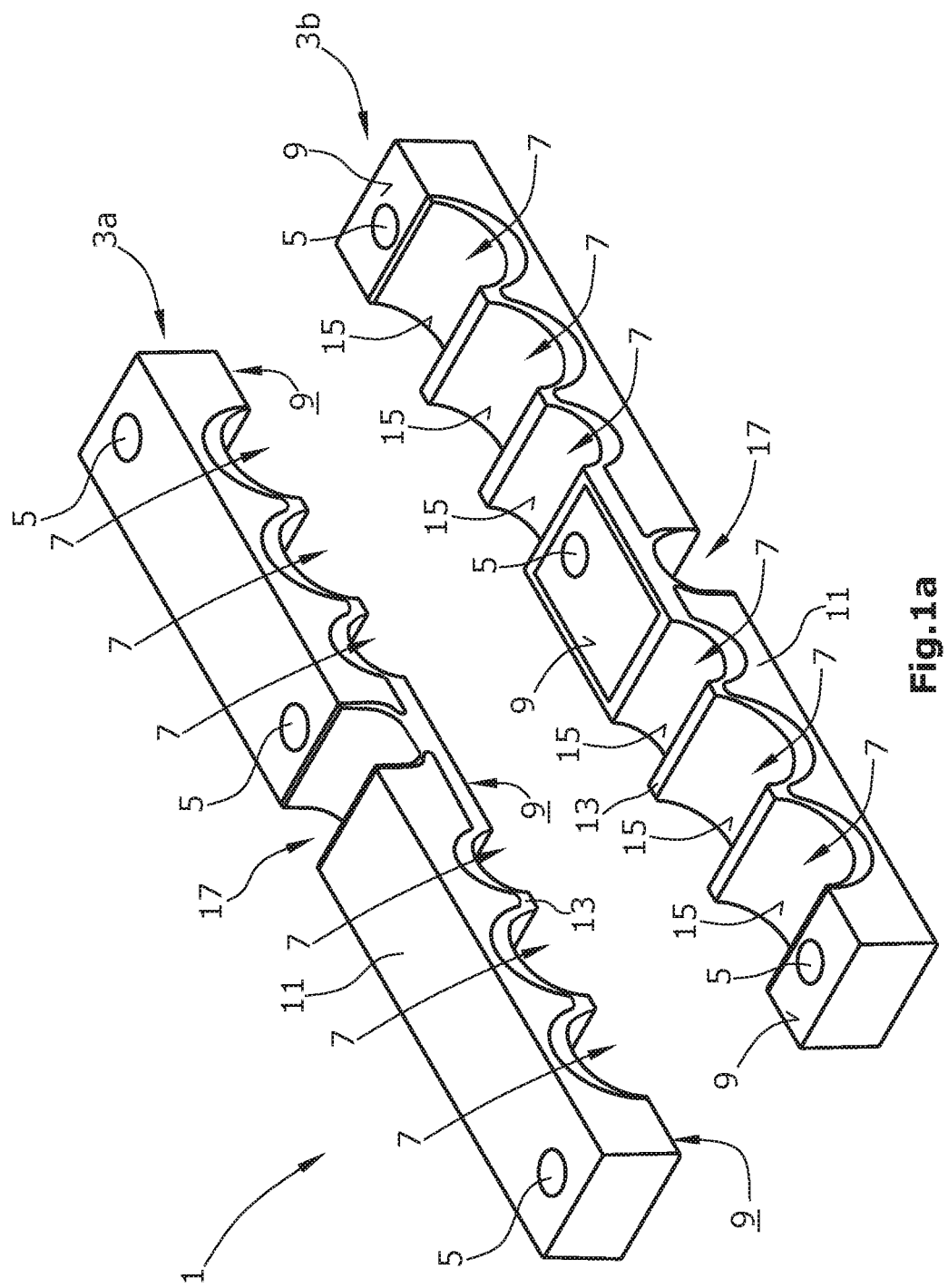

FASTENING DEVICE FOR HOSES

FIELD

Exemplary embodiments of the present invention relate to a fastening device for hoses.

BACKGROUND

Such fastening devices are used e.g. for hydraulic hoses on construction vehicles. Here, it is a general problem that the hydraulic hoses show signs of fatigue caused by "chafing". In known fastening devices, also referred to as hose clamps, damage to the hose may be caused primarily by sharp and rigid edges on the fastening devices. Here, the inner fabric of the hydraulic hoses may be exposed and, in extreme cases, the fabric may even rupture, leading to a loss of hydraulic fluid and thus to a failure of the machine.

In addition, hydraulic hoses have a high tolerance with respect to their outer diameter so that they can either not be fixed well or are excessively compressed when conventional hose clamps are used.

A fastening device is known from WO 2015/177181 A1. In the known fastening device, it is provided that an elastic insert is placed in the fastening bodies, wherein the contact surface provided between the fastening body and the elastic insert is kept small for vibration and sound damping. The sound and vibration reducing properties were reduced further by making the difference between the outer diameter and the inner diameter of the insert as great as possible. For a further reduction of sound and vibrations, supporting bodies are arranged on the inner side of the elastic insert, so that the hose received in the fastening device is supported only "at intervals". The elastic insert is retained in a form-fitting manner in the fastening body.

It has been found for the known fastening devices that due to the plurality of parts that have to be matched in a custom-fit manner, the handling is hardly practicable and the assembly thereof and the placing of hydraulic lines is made difficult. This results in higher production and maintenance efforts. In case of strong vibrations, the form-fit fastening of the elastic insert may lead to the insert being strongly deformed and pushed out of the fastening body.

Other embodiments of fastening devices in which the fastening device is entirely or almost entirely made of an elastic material, have the disadvantage that the fastening device may become warped, may yield and/or be compressed when being fastened. This may e.g. lead to the clamps coming loose inadvertently or compressing the hydraulic hose excessively. Moreover, the elastic material makes it difficult to exactly fix the hose with a desired torque.

SUMMARY

Therefore, it is an object of the resent invention to provide a fastening device of the above mentioned kind, which has a simple structure and enables a simplified assembly, as well as a secure and at the same time a gentle fixation of the hose. Further, the fastening device is to avoid a squeezing of the hose, if possible.

The fastening device of the invention comprises two fastening parts adapted to be joined with each other and each having at least one recess, wherein, in the joined state of the fastening parts, the recesses form at least one passage for at least one hose. The fastening parts are each formed by a fastening body and an elastic fastening component, wherein the fastening body has a lower elasticity than the elastic fastening component, and wherein a recess surface is formed in each recess by an elastic layer. The invention is characterized in that the elastic fastening component is molded on the fastening body for a chemical bond with the same. The fastening device of the present invention thus provides that the fastening parts are each formed as integral parts, since the elastic fastening component is fixedly molded thereto when manufactured in a molding process, e.g. by injection molding. The elastic fastening component is thus formed by an elastic section of the fastening part. Therefore, when fastening a hose, only the two fastening parts have to be joined so that a very fast and simple assembly becomes possible. Within the framework of the present invention, the feature that the elastic fastening component is molded to the fastening body, means both that the fastening body is molded first and the elastic fastening component is molded subsequently and the inverted order. The invention also covers a simultaneous manufacture. The manufacture of the fastening device may be effected by two-component injection molding (2K injection molding). The elastic section may form a thick layer that lines the recess at least in part.

The fastening device is essentially formed by two fastening parts which are connected with each other e.g. by screws. Thus, a simple storage is possible due to the small number of parts. The elastic fastening component prevents a chafing of the hoses held in the fastening device, since only the fastening component is in contact with the respective hose.

The two fastening parts forming the fastening device are preferably identical. Thereby, the manufacturing and storage efforts are maintained low. Within the framework of the invention, a lower elasticity means that the fastening body e.g. has a modulus of elasticity that is at least 100 times the modulus of elasticity of the elastic fastening component.

The recess surface of the fastening parts is the surface that at least partly contacts the hoses when the hoses are fixed.

Due to the chemical bond, a very strong connecting is formed between the fastening body and the elastic fastening component, while allowing for a simple manufacture.

It is preferably provided that the recess surface has a main curvature in a main curvature direction extending transversely to the direction of passage, wherein the main curvature has a varying radius. In other words: the recess surface does not have a perfectly semi-circular cross section, but the cross section is e.g. semi-oval. With hoses which, due to great tolerances, do not have the predetermined outer diameter, it is thereby prevented that the flow cross section of the hose is unduly changed by being squeezed by the fastening device, since the flow cross section can correspondingly expand sideways in the passage. A recess surface of such design also allows hoses having a slightly smaller diameter to be fastened in an advantageous manner.

The recess preferably has a cross section of semi-elliptical shape or the shape of a segment of an ellipse.

It is preferably provided that the recess surface is formed to be stepless at least in the region forming a passage for the hose. Thus, the recess surface can contact the hose by a large surface so that the load on the outer surface of the hose is maintained low. Further, the shape of the fastening parts is kept simple so that no intricately designed molds are necessary for their manufacture.

Due to the fastening body having a lower elasticity than the elastic fastening component, it is possible to fasten the hose in an advantageous manner, since the fastening body only deforms very little. When e.g. fastening screws are used to join the fastening parts, it is possible e.g. to predetermine a defined tightening torque or a range of the tightening torque with which the fastening parts are to be joined.

It is preferably provided that the fastening body is made of a thermoplastic material and/or that the elastic fastening component is made of a thermoplastic elastomer. Such materials have proven particularly advantageous. When using the fastening body of a thermoplastic material and the elastic fastening component of a thermoplastic elastomer, the desired difference in elasticity between these two elements is achieved and, in addition, the compatibility of the materials is given so that the chemical bonding can be effected by molding the parts to each other. The fastening body may e.g. be made of a polypropylene (PP) or a polyamide (PA).

With the fastening device of the present invention, it may be provided that the fastening parts each have a plurality of recesses which form a plurality of passages when the fastening parts are in the joined state. In other words: the fastening device of the invention may form a holder for a plurality of hoses so that a plurality of hoses can be guided in parallel. In particular, with hydraulic hoses, it is often necessary to place two parallel hoses, since at least one feed and drain line to a consumer are necessary. Thus, the fastening device of the invention is suited in particular for hydraulic hoses. The recesses may differ in dimension so that the fastening device of the present invention is adapted to also hold hoses of different diameters.

It may be provided that the elastic fastening component forms the recess surface for a plurality or all recesses of a fasting part. In other words: the elastic fastening component extends over a plurality of recesses or is uninterrupted. In this manner, a fastening device of such design is particularly simple to manufacture.

Preferably, it is provided that the fastening bodies of the fastening parts each form at least one contact surface for the respective other fastening part. It is thereby ensured that the fastening bodies having a lower elasticity abut on each other in the fastened state of the fastening parts, whereby a particularly stable connection of the fastening parts can be achieved and an undesired deforming of the fastening parts can be prevented.

In one embodiment of the invention it is provided that at least one of the fastening parts comprises a mounting recess. The fastening device can be fastened to its environment via the mounting recess, e.g. to separate holders on a vehicle or on pipes.

It may be provided that the mounting recess has a separate elastic section or that the elastic fastening component extends into the mounting recess. By providing an elastic section in the mounting recess, it can be achieved that that a transmission of vibrations from the surroundings to the fastening device and vice versa can be reduced.

BRIEF DESCRIPTION OF THE DRAWINGS

The invention will be explained in more detail hereunder with reference to the following Figures. In the Figures:

FIG. 1a is a schematic perspective view of a fastening device according to the invention.

FIGS. 1a and 1b schematically illustrate a fastening device according to the invention.

DETAILED DESCRIPTION

Figure 1B:
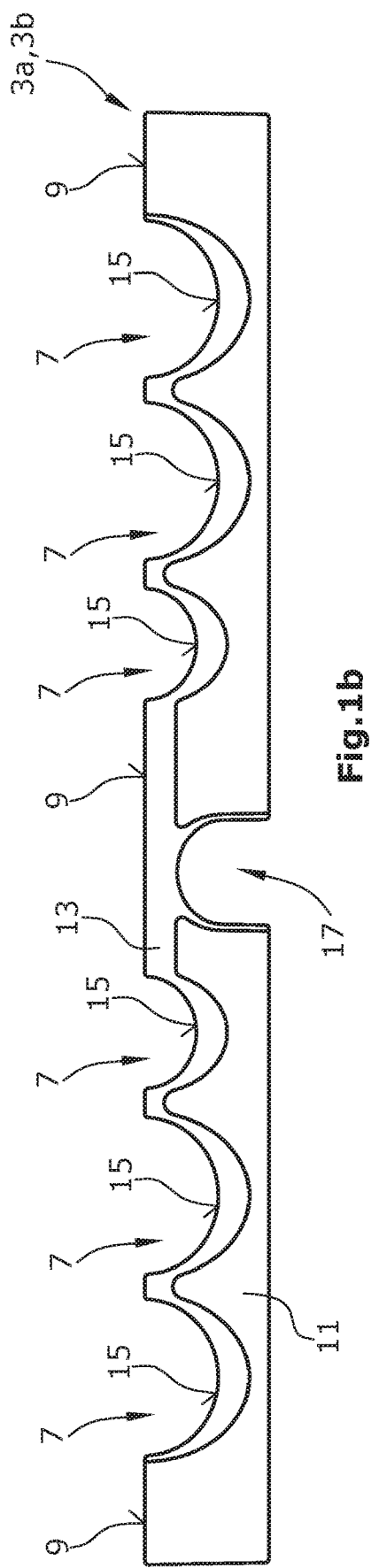
FIG. 1b is a schematic side view of a fastening part of the fastening device illustrated in FIG. 1a, and FIG. 2 is a schematic side view of a fastening part of a second embodiment of a fastening device according to the invention.

The fastening device 1 is formed by two fastening parts 3a, 3b of identical design. The fastening parts 3a, 3b can be joined by arranging an upper fastening part 3a in an inversed manner with respect to the lower fastening part 3b. The sides of the fastening parts 3a, 3b now facing each other are thereby matched to each other. Throughbores 5 are provided in the fastening parts 3a, 3b so that the fastening parts 3a, 3b can be connected with each other using fastening means such as screws, for example.

The fastening parts 3a, 3b each comprise recesses 7 which, in the connected state of the fastening parts 3a, 3b, form passages for hoses, such as e.g. hydraulic hoses. Using the embodiment illustrated in FIGS. 1a and 1b, it is possible to hold 6 hoses. In the connected state, the fastening parts 3a, 3b contact each other by contact surfaces 9.

The fastening parts 3a, 3b are each formed by a fastening body 11 and an elastic fastening component 13. The fastening body and the elastic fastening component 13 are chemically bonded together, wherein the elastic fastening component 13 is molded to the fastening body 11. The manufacture of the fastening device 1 may be done e.g. by means of a two-component injection molding process (2K injection molding).

The elastic fastening component 13 is arranged in the recesses 7 and forms a respective recess surface 15 therein. In use, the recess surfaces 15 are partly in contact with the hoses.

As can best be seen in FIG. 1b, the recesses 7 each have a semi-oval cross section. The same is obtained by the recess surface 15 having a main curvature extending transversely to the direction of passage, the radius of said curvature changing. Due to the oval cross section it is achieved that hoses having an outer diameter slightly larger than the passages formed by the recesses 7, are not squeezed, but can expand a little to the sides. The recess surfaces 15 are formed to be step-less. Thereby, an advantageous fastening of the hoses is achieved, since the recess surfaces 15 can contact the hoses in a very large area.

The fastening body 11 has a significantly lower elasticity than the elastic fastening elements 13. For example, the fastening body 11 may have a modulus of elasticity of at least 200 times the modulus of elasticity of the elastic fastening component 13. Thereby, the fastening body is designed to be significantly more stable, and when connecting the two fastening parts 3a, 3b, it is prevented that the fastening parts 3a, 3b become undesirably warped. For this purpose, it is particularly provided that the contacting surfaces 9 are formed by the fastening body 11 and thus have the high rigidity.

The fastening body 11 may be made e.g. of a thermoplastic material, whereas the elastic fastening component is formed e.g. of a thermoplastic elastomer.

The elastic fastening component 13 is formed in a continuous manner, wherein, besides the chemical bond, a form-fit connection with the fastening body 11 is formed at least in part, whereby a higher stability can be obtained.

On the side opposite the recesses 7, the fastening parts 3a, 3b each have a mounting recess 17. The elastic fastening component 13 extends into the mounting recess 17. The fastening device 1 of the present invention can be mounted advantageously to its environment via the mounting recess 17.

Figure 2:
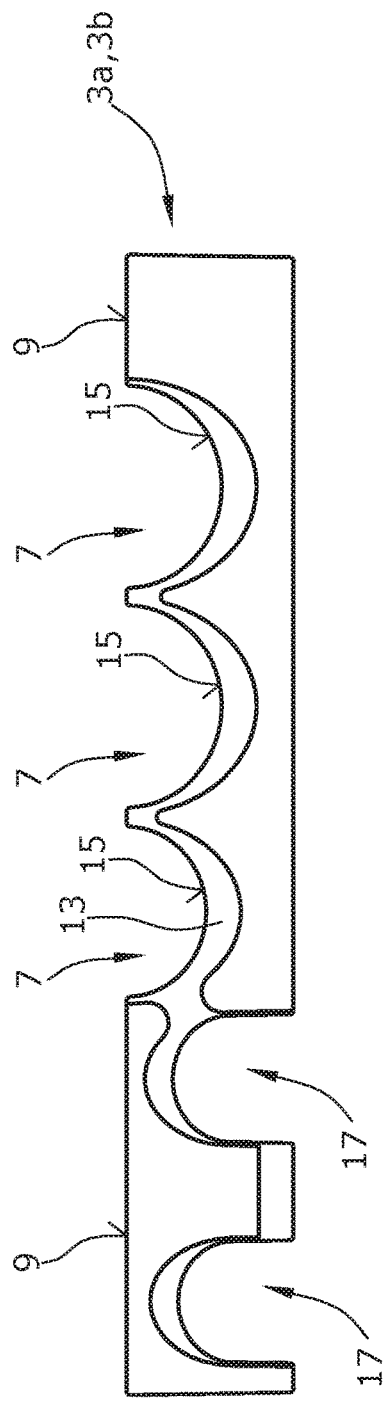

FIG. 2 is a schematic side view of a fastening part 3a, 3b of a second embodiment of a fastening device according to the invention. The fastening part 3a, 3b illustrated in FIG. 2 is of a structure similar to that of the fastening parts 3a, 3b shown in FIGS. 1A and 1B, but the fastening part 3a, 3b illustrated in FIG. 2 has a small number of recesses 7. A fastening device formed with the fastening part 3a, 3b illustrated in FIG. 2 can thus form passages for three hoses.

Further, the fastening part 3a, 3b illustrated in FIG. 2 has two mounting recesses 17. Thereby, a flexible mounting of the fastening device is possible by using one of the mounting recesses. As an alternative, both mounting recesses 17 can be used, whereby a particularly stable mounting is possible, which, in addition, avoids a twisting of the fastening device.

The invention claimed is:

1. A fastening device for hoses, comprising:
two fastening parts adapted to be joined with each other and each having at least one recess which, in the joined state of the fastening parts, form at least one passage for at least one hose,
wherein the fastening parts are each formed by a fastening body with an elastic fastening component,
wherein the fastening body has a lower elasticity than the elastic fastening component,
wherein the elastic fastening component respectively forms a recess surface in the recess,
wherein, when the at least one hose is fixed, the recess surface contacts the at least one hose,
wherein the elastic fastening component is chemically bonded to the fastening body,
wherein the recess surface has a main curvature extending transversely to a direction of the at least one passage,
wherein the main curvature has a changing radius,
wherein each fastening body forms at least one contact surface for contacting the respective other fastening part, the at least one contact surface having a through-bore provided therein, and wherein at least one of the fastening parts comprises a mounting recess for mounting the fastening device to an environment.

2. The fastening device of claim 1, wherein each recess has a cross section of semi-elliptic shape or a shape of a segment of an ellipse.

3. The fastening device of claim 1, wherein the recess surface is stepless at least in the area forming a passage for a hose.

4. The fastening device of claim 1, wherein the fastening body is formed of a thermoplastic material and/or the elastic fastening component is formed of a thermoplastic elastomer.

5. The fastening device of claim 1, wherein the fastening parts each have a plurality of recesses which, in the joined state of the fastening parts, form a plurality of passages.

6. The fastening device of claim 5, wherein the elastic fastening component forms the recess surface of a plurality or all recesses of the fastening part.

7. The fastening device of claim 1, wherein the mounting recess comprises a separate elastic section.

8. The fastening device of claim 1, wherein the elastic fastening component extends into the mounting recess.

* * * * *